United States Patent
Joshi et al.

(10) Patent No.: US 6,327,426 B1
(45) Date of Patent: Dec. 4, 2001

(54) APPARATUS AND METHOD FOR DELIVERING A BENEFICIAL AGENT

(75) Inventors: Ashok V. Joshi; Truman Wold, both of Salt Lake City, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 0 days.

(21) Appl. No.: 09/696,839

(22) Filed: Oct. 26, 2000

(51) Int. Cl.[7] .................................. A01G 13/06; F24F 6/08
(52) U.S. Cl. ............................................. 392/356; 392/395
(58) Field of Search ..................................... 392/386, 387, 392/390, 394, 395; 122/366; 261/139, 142, 94, 95, 99

(56) References Cited

U.S. PATENT DOCUMENTS

| | | | |
|---|---|---|---|
| 3,688,083 | * 8/1972 | Rice et al. | 392/488 |
| 3,826,895 | * 7/1974 | Schladitz | 392/488 |
| 3,869,242 | * 3/1975 | Schladitz | 392/396 |
| 3,934,117 | * 1/1976 | Schladitz | 392/488 |
| 4,037,353 | * 7/1977 | Hannart et al. | 392/390 |
| 4,266,116 | * 5/1981 | Bauer et al. | 392/324 |
| 5,014,337 | * 5/1991 | Dessage | 392/395 |
| 5,093,894 | * 3/1992 | Deevi et al. | 392/390 |

\* cited by examiner

*Primary Examiner*—Sang Paik
(74) *Attorney, Agent, or Firm*—Factor & Partners

(57) ABSTRACT

An apparatus for delivering a beneficial agent to a surrounding area comprising a first electroactive electrode, a beneficial agent, a second electroactive electrode and an electrical associating member. The first electroactive electrode includes an outer surface, a portion of which is exposable to the surrounding area. The beneficial agent is dispersed within the first electroactive electrode. The second electroactive electrode is associated with the first electroactive electrode. The electrical associating member electrically associates the first electroactive electrode and the second electroactive electrode, to, facilitate corrosion of the exposable surface of the first electroactive electrode, upon exposure of same to the surrounding area, and, in turn the release of the beneficial agent.

36 Claims, 4 Drawing Sheets

APPARATUS AND METHOD FOR DELIVERING A BENEFICIAL AGENT

BACKGROUND OF THE INVENTION

1. Field of the Invention

The invention comprises a beneficial agent delivery device, and, more particularly, a method and apparatus for delivering a beneficial agent into a surrounding area.

2. Background Art

Devices for delivery of beneficial agents to a surrounding area are well known in the art. While devices are known, there is a constant need for an improved delivery apparatus which serves to more accurately, more easily and more effectively deliver a beneficial agent to a surrounding area.

Figure 14:
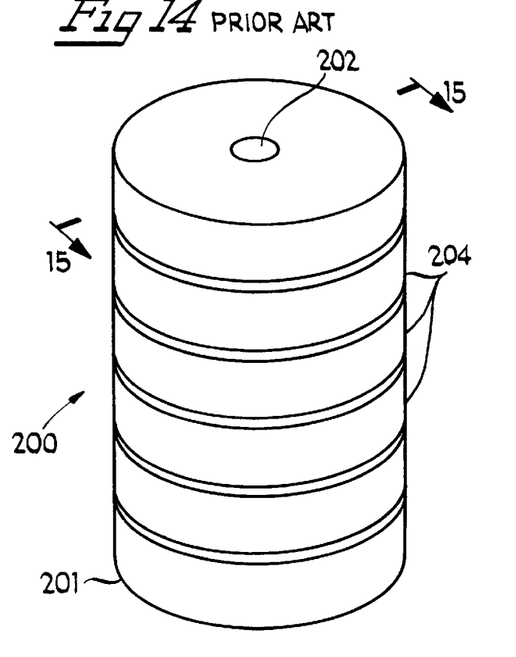
FIG. 14 of the drawings is a perspective view of a prior art device.
Figure 15:
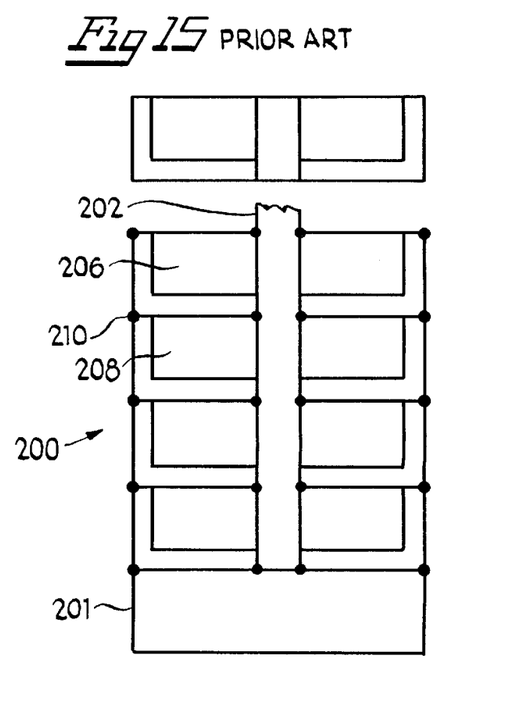
FIG. 15 of the drawings is a cross-sectional view of the prior art device taken generally about lines 15—15 of FIG. 14.

One particular type of delivery device for the delivery of beneficial agents has taken advantage of the galvanic effect between two different materials. For example, a prior art device is shown in FIGS. 14 and 15 of the drawings generally as 200. In such a prior art device, cathode 201 is paired with anode rod 202 having a stack of ring-like elements 204 associated with the rod. As shown in FIG. 15, the ring-like members include internal reservoirs 306 of capable of holding a beneficial agent 208. The rings include seals 110 such that when the rings are stacked upon each other about the anode rod, the rings and seals serve to seal each of the internal reservoirs and portions of the anode from their surroundings. Due to the anode and cathode materials utilized, the anode corrodes when the materials are exposed to ambient conditions, or other predetermined conditions (i.e. a liquid or gas environment wherein the liquid or gas forms the electrolyte). As the anode corrodes beyond a ring member (as shown in FIG. 15), the ring member is no longer retained by the rod, and the ring member releases from the stack of rings, thereby exposing the subsequent ring, and, the reservoir holding the beneficial agent. At such time, the beneficial agent is released. This process continues until the anode is no longer exposed to the ambient conditions, or until the anode completely corrodes and releases all of the rings.

While such an apparatus has facilitated the delivery of beneficial agents, the apparatus includes several drawbacks. For example, the apparatus utilizes a single anode. Due to the single anode, it is very difficult to vary or control the rate at which the beneficial agent is exposed, or the rate at which the beneficial agent is released.

Thus it is an object of the invention to provide an improved apparatus and method of delivering a beneficial agent.

SUMMARY OF THE INVENTION

One aspect of the invention comprises an apparatus for delivering a beneficial agent to a surrounding area. The apparatus includes a first electroactive electrode, a beneficial agent, a second electroactive electrode and electrical associating means. The first electroactive electrode includes an outer surface. At least a portion of the outer surface is exposable to the surrounding area. The beneficial agent is dispersed within the first electroactive electrode. The second electroactive electrode is associated with the first electroactive electrode. The electrical associating means electrically associates the first electroactive electrode and the second electroactive electrode, to, facilitate corrosion of the exposable surface of the first electroactive electrode when the first electroactive electrode is exposed to the surrounding area (i.e. the gas or liquid surrounding the electrodes forms an electrolyte). As the first electroactive electrode is corroded, the beneficial agent is delivered.

In one preferred embodiment, the first electroactive electrode and the beneficial agent are formed into a composite wherein the beneficial agent is encapsulated within a matrix formed by the first electroactive electrode. In another embodiment the first electroactive electrode, second electroactive electrode and beneficial agent are formed into a composite wherein the beneficial agent is encapsulated within a matrix formed by the first electroactive electrode and second electroactive electrode.

In another preferred embodiment, the first electroactive electrode comprises at least two spaced apart first electroactive electrode layers defining a space between the layers. In such an embodiment, the beneficial agent is positioned within the spaces. The electrical associating means further electrically associates the first electroactive electrode layers to each other, and, in turn, to the second electroactive electrode.

In one such embodiment, the first electroactive electrode includes multiple layers and multiple spaces between the layers. Different beneficial agents may be positioned within the multiple spaces. While not required, each first electroactive electrode layer may be substantially similar in thickness.

In another embodiment of the invention, the first electroactive electrode includes one or more voids, and, beneficial agents are disbursed within the voids. The voids may be substantially uniform in shape, and uniformly dispersed within the first electroactive electrode.

In a preferred embodiment of the invention, the apparatus further includes means for controlling the rate of corrosion of the exposed surface of the first electroactive electrode. In one embodiment, the corrosion rate controlling means comprises a resistor. In another such embodiment, the corrosion rate controlling means comprises any one or more of the following devices: power source, a power cell, a battery, current limiting devices, electronic circuitry, diodes, capacitors, resistors, IC's, and transistors.

In a preferred embodiment, the first electroactive electrode comprises a top surface, a bottom surface and a cylindrical surface. In such an embodiment, a portion of the top surface comprises the exposed area.

In one preferred embodiment, the beneficial agent may comprise any one or more of pain medicaments, antiparasitic drugs, growth hormones, diabetic agents, anesthetic agents, and, anti-bloating agents.

In another preferred embodiment, the exposable portion of the first electroactive electrode comprises at least two different first electroactive electrode materials.

The invention further includes a method for delivering a beneficial agent to a surrounding area. The method comprises the steps of providing a beneficial agent, dispersing the beneficial agent within a first electroactive electrode, exposing a portion of an outer surface of the first electroactive electrode, electrically associating the first electroactive electrode with a second electroactive electrode, corroding at least a portion of the exposed portion of the first electroactive electrode and releasing the beneficial agent disbursed within the first electroactive electrode upon corrosion thereof.

In a preferred embodiment of the method, the step of providing a beneficial agent may comprise the step of providing at least two beneficial agents, the step of dispersing the beneficial agent may comprise the step of dispersing at least two beneficial agents, and, the step of releasing the beneficial agent may comprise the step of sequentially releasing one of the at least two beneficial agents and then the other of the at least two beneficial agents.

In another preferred embodiment of the method, the step of providing a beneficial agent may comprise the step of providing at least two beneficial agents, the step of dispersing the beneficial agent may comprise the step of dispersing at least two beneficial agents, and, the step of dispersing the beneficial agent may comprise the step of alternatively releasing one of the at least two beneficial agents and the other of the at least two beneficial agents.

In another preferred embodiment, the method may further comprise the step of controlling the rate at which the first electroactive electrode corrodes.

In another preferred embodiment, the step of dispersing the beneficial agent comprises the step of molding the first electroactive electrode material (and, optionally, the second electroactive electrode) with the beneficial agent to form a composite.

In yet another preferred embodiment, the step of dispersing the beneficial agent comprises the steps of providing at least two spaced apart first electroactive electrode layers, and, placing the beneficial agent between the at least two spaced apart first electroactive electrode layers.

Preferably, the step of dispersing beneficial agent comprises the steps of providing a first electroactive electrode having at least one void therein, and, placing the beneficial agent within the void of the first electroactive electrode.

In yet another embodiment of the method, the first electroactive electrode comprises at least two different materials and the step of exposing comprising the step of exposing each of the at least two different materials.

The invention likewise comprises another apparatus for delivering a beneficial agent to a surrounding area. The apparatus comprises at least two modules wherein the at least two modules are positioned in series so as to place the first electroactive electrodes of each module in electrical communication with each other. Each module includes a first electroactive electrode, a second electroactive electrode, and a means for releasably retaining at least one beneficial agent. The first electroactive electrode includes an outer surface, a portion of the outer surface being exposable to the surrounding area. The second electroactive electrode is in electrical communication with the first electroactive electrode. The releasable retaining means is capable of releasably retaining at least one beneficial agent upon corrosion or mass transfer of the exposable surface of the first electroactive electrode.

In a preferred embodiment, the releasable retaining member of at least one of the at least two modules further comprises a reservoir releasably associated with the anode. The reservoir defines a cavity for retaining a beneficial agent. In such an embodiment, the releasable retaining means further includes means for sealing the cavity, to, in turn, render the cavity substantially fluid-tight.

In another preferred embodiment, the releasable retaining member of at least one of the at least two modules further comprises at least two reservoirs. Each reservoir including a cavity for retaining a beneficial agent.

BEST MODE FOR PRACTICING THE INVENTION

While this invention is susceptible of embodiment in many different forms, there is shown in the drawings and will be described in detail, several specific embodiments with the understanding that the present disclosure is to be considered as an exemplification of the principles of the invention and is not intended to limit the invention to the embodiments illustrated.

Figure 1:
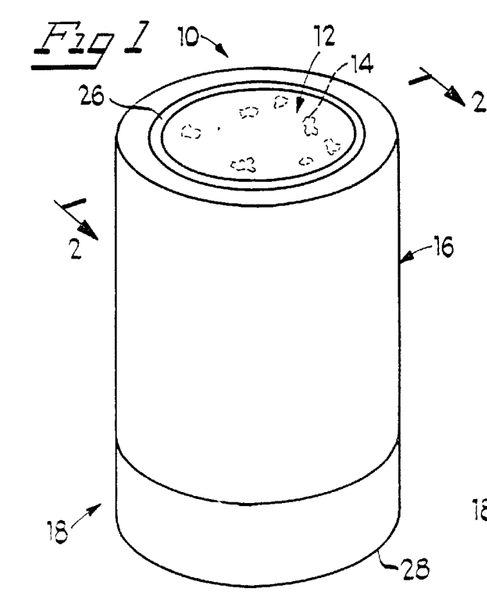
FIG. 1 of the drawings is a perspective view of a first embodiment of the present invention.
Figure 2:
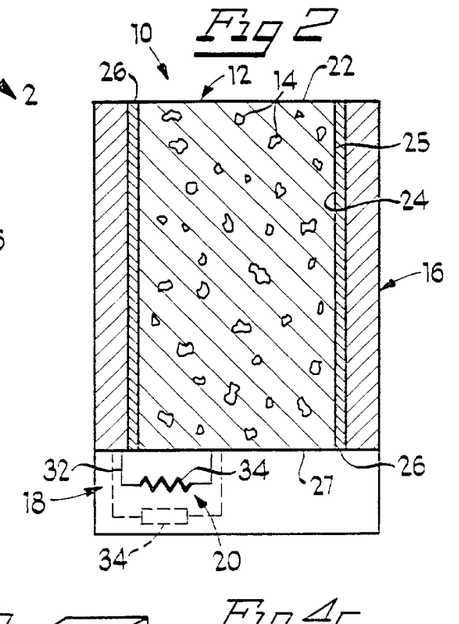
FIG. 2 of the drawings is a cross-sectional view of the first embodiment of the present invention taken generally about lines 2—2 of FIG. 1.

Referring now to the Figures, and in particular FIGS. 1 and 2 of the drawings, a first embodiment of apparatus 10 is shown as comprising first electroactive electrode 12 (also referred to as an anode), beneficial agent 14, second electroactive electrode 16 (also referred to as a cathode), means 18 for electrically associating the anode and the cathode and means 20 (FIG. 2) for controlling the rate of corrosion of the anode. Apparatus 10 may be utilized in various environments and in various fields of use. For example, apparatus 10 may be ingested by animals so as to deliver the beneficial agent to the gastro-intestinal system of the animal. As another example, apparatus 10 may be exposed to ambient so as to deliver the beneficial agent into the atmosphere. Of course, the system is not limited to any one particular field of use, and the foregoing fields of use are for illustrative purposes only.

Shown in greater detail in FIG. 2, anode/first electroactive electrode 12 comprises a substantially cylindrical member having exposed surface 22, non-exposed surface 24, cylindrical surface 25 and bottom surface 27. As will be understood, exposed surface 22 is exposed to ambient conditions (i.e. the gastrointestinal environment of an animal, a fluid in which the device is submerged, or in the air). Conversely, non-exposed surface 24 is precluded from exposure to ambient conditions. It will be understood that other uniform, non-uniform, symmetrical and asymmetrical shapes, cross-sectional areas and configurations are likewise contemplated, and that the invention is not limited to a uniform cylindrical shape.

In certain embodiments, such as the embodiment shown in FIGS. 1 and 2, seal 26 and cap 28 preclude exposure of non-exposed surface 24 (i.e., cylindrical surface 25 and bottom surface 27) to the ambient conditions. As will be explained, seal 26 and cap 28 are non-reactive with either the anode material or the cathode material. In certain embodiments, retaining means such as retaining means 120 of FIG. 11 may be employed. Additionally, prior to use, it will be understood that exposed surface 22 may include a covering (not shown) to preclude inadvertent exposure of the exposed surface prior to the time when such exposure is desired.

Beneficial agent 14 is shown in the embodiment of FIGS. 1 and 2 as comprising one of a fluid, gel, powder or a solid which is dispersed within the anode. As will be explained with respect to manufacturing, the anode material and the beneficial agent can be mixed and cast such that the beneficial agent is encapsulated within in a matrix of the anode. The beneficial agent can comprise any number of materials, such as, pain medicaments, anti-parasitic drugs, growth hormones, diabetic agents, anesthetic agents, anti-bloating agents in solid, powder, gel or liquid form. Of course, the type of material that is used will depend on the type of environment in which it is utilized, and, the invention is not limited to any type of beneficial agent.

Cathode/second electroactive electrode 16 is shown in the embodiment of FIGS. 1 and 2 as comprising a cylindrical ring which encircles the anode material and seal 26. At least a portion of cathode 16 is exposed to the ambient conditions, i.e. the conditions to which exposed surface 22 of anode 12 is exposed. In the embodiment shown, seal 26, in addition to precluding the exposure of non-exposed surface 24 of the anode to ambient conditions, likewise serves to isolate and insulate the anode from the cathode. Of course in various other embodiments, the cathode may take various different configurations, i.e. non-uniform shapes, configurations which are not complimentary and/or related to the shape of the anode.

The anode and the cathode can be selected from various material pairs, wherein electrical association (i.e. electrically conductive communication) between the anode and the cathode results in corrosion of the anode, or, mass transfer between the anode and cathode. It will be understood that corrosion as referred to hereinbelow in the specification and claims comprises both corrosion and mass transfer. Such corrosion takes place wherein the anode has a greater value on the galvanic scale than the cathode. Such common cathode and/or anode materials comprise, but are not limited to, Al, Cu, Mg, Fe, Zn, Ag, Ca as well as mixtures and alloys thereof. In certain applications, the cathode may likewise comprise a conductive plastic material.

Figure 3:
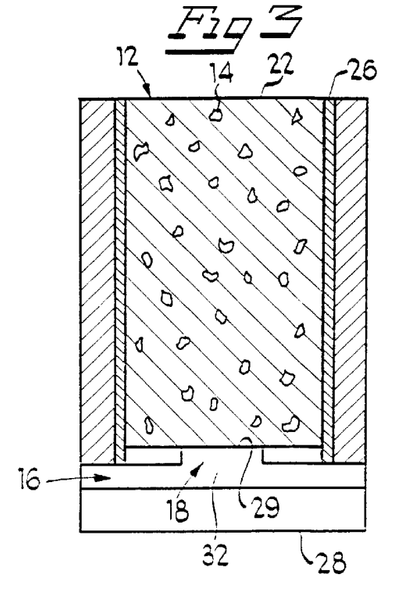
FIG. 3 of the drawings is a cross-sectional view of an alternate version of the first embodiment of the present invention.
Figure 4A:
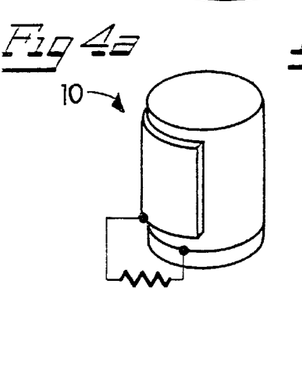
FIG. 4a of the drawings is perspective of a sample configuration of the first electroactive electrode and second electroactive electrode of the apparatus of the present invention.
Figure 4B:
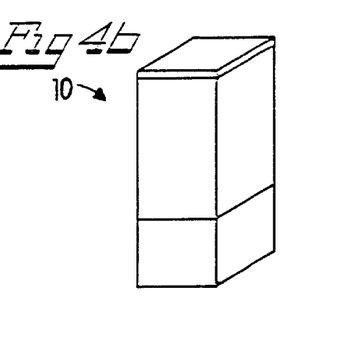
FIG. 4b of the drawings is perspective of a sample configuration of the first electro active electrode and second electro active electrode of the apparatus of the present invention.
Figure 4C:
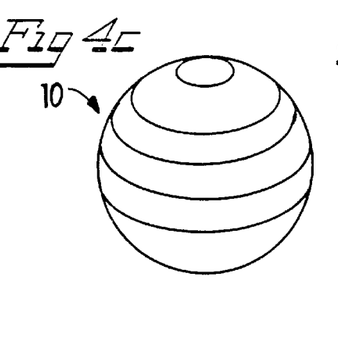
FIG. 4c of the drawings is perspective of a sample configuration of the first electroactive electrode and second electroactive electrode of the apparatus of the present invention.
Figure 4D:
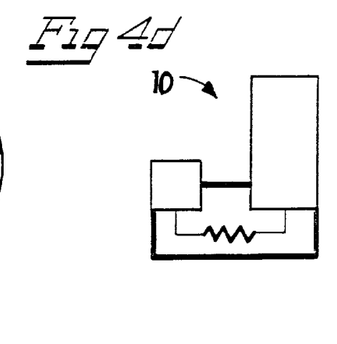
FIG. 4d of the drawings is perspective of a sample configuration of the first electroactive electrode and cathode of the apparatus of the present invention.

Electrical associating means 18, as shown in FIG. 2, comprises electrical connection 32. Electrical connection 32 places anode 12 and cathode 16 into electrical communication. Electrical connection 32 comprises a suitable conductive wiring, made from a conductive metal (i.e. one that is similar to or identical to either one of the anode and cathode, and/or, compatible with both). In another embodiment, as shown in FIG. 3, the anodic and cathodic components may physically contact each other, such as, about contact region 29. In such an embodiment, the physical connection comprises the electrically associating means.

Referring again to FIGS. 1 and 2, corrosion rate controlling means 20 comprises resistive element 34. Resistive element 34 may comprise a common resistor having predetermined resistance. As will be understood, the size of the resistor will have an effect on the speed at which the particular anode of an anode/cathode pair corrodes in a given environment. For example, the larger the resistive element (i.e., higher the resistance), the slower the anode will corrode (while maintaining other conditions constant). Conversely, the smaller the resistive element, the faster the rate at which the anode will corrode. Additionally, it is likewise contemplated that the resistive element may comprise a variable resistor, whose resistance can be changed automatically, for example, based upon outside conditions or based on temporal conditions, as well as manually. Further still, as shown in FIG. 1 in dashed lines, the corrosion rate controlling means may comprise other elements 34', which may comprise a power source, a power cell, a battery, a current limiting device or other electronic circuitry (i.e. IC's, diodes, transistors, capacitors, etc.), as well as combinations of the foregoing.

To manufacture the apparatus of the embodiment shown in FIG. 1, an anode material is provided. The anode material is generally provided in a powdered state, or in a molten state. Subsequently, a beneficial agent is introduced and mixed into the anode material. Once the beneficial agent is fully introduced into the anode material, the anode is solidified (i.e. cooled if in the molten state or otherwise solidified if provided in the powdered state). For example, the anode can be placed into a mold wherein the material will be cast into the shape of the mold. Once cast, the beneficial agent becomes dispersed within an anode matrix. It will be understood that the beneficial agent in such an embodiment must be able to withstand the stresses associated with the heating and melting of the anode material. Once cast, the anode can be machined, if needed, to finalize the shape of the anode.

Once fully formed, seal 26 is placed about cylindrical surface 25 of the formed anode so as to form the insulation and isolation from the cathode material and the environment. In the embodiment shown, seal 26 may comprise a sleeve which is slid into the desired position, or, it may comprise a coating (i.e. paint, plastic, etc) which is applied to the anode in a liquid form and then solidified.

Next, the anode and coating are slid into the inner region of the cathode until the anode is virtually completely surrounded by the cathode. Of course, in other embodiments, the relative attachment of components (i.e. the anode and the cathode) may be different. Examples of different attachment structures and different anode/cathode configurations are shown in FIGS. 4a–d.

Once the cathode and the anode are associated with each other, the electrical connecting means are supplied. Specifically, and explained above, the anode and the cathode are joined by a conductive wire of a material compatible with each. In certain embodiments, controlling means may be provided by the placement of one or more resistive elements in parallel or in series with each other. The particular resistance values can be determined experimentally based upon the particular environment or field of use. In other embodiments, the controlling means may comprise current limiting device, a power source or other electronic circuitry which is provided and attached to the electrical connecting means. In still other embodiments, the anode and the cathode may be physically connected to each other (FIG. 3). Once complete, cap 28 is placed over lower surface 27 of anode 12 to preclude exposure thereof.

To preclude corrosion of the anode prematurely, the exposed surface may be covered with the covering member which may comprise a cap, a coating or an adhesive cover. It will be understood that the covering is removed prior to use. In certain embodiments, the covering member can be of a degradable material which degrades upon placement of the apparatus in the desired environment. For example, wherein the apparatus is inserted into the gastrointestinal system of an animal, the anode can be coated with a material which dissolves when exposed to the acids and fluids of the stomach of the animal. Once fully assembled, the apparatus is ready for use.

The operation of the embodiment will be discussed relative to use the apparatus for purposes of insertion into the gastrointestinal system of an animal, with the understanding that the application is not limited thereto. In such an environment, the apparatus is selected which includes a cathode and an anode which are compatible with the environment, and, which includes a beneficial agent which the user is desirous of releasing into the animal's gastrointestinal system. Once the apparatus is selected, if necessary, the covering is removed (in certain embodiments, this is not necessary, as the covering is automatically removed upon placement in the desired environment). Next, the apparatus is inserted into the animal, through the mouth or surgically into the stomach.

Once in the desired environment, the fluid within the stomach of the animal places the exposed surface of the anode in electrical communication with the cathode (i.e. the fluid in the stomach comprises the electrolyte). As such, corrosion of the anode begins. As the anode corrodes, the beneficial agent which is dispersed within the anode is released into the stomach of the animal. It will be understood that the rate of corrosion (for a particular anode, cathode and electrolyte) can be varied by altering the resistance of the resistive element of the rate control means. The corrosion of the anode, and, in turn, the release of the beneficial agent continues until the anode is completely exhausted, or until removed from the environment (electrolyte).

Figure 5:
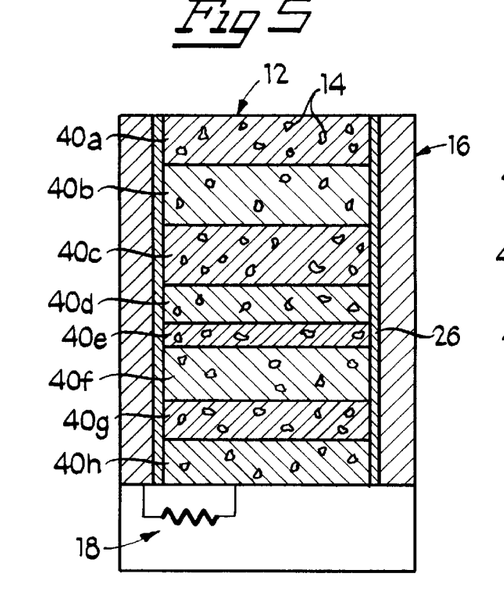
FIG. 5 of the drawings is a cross-sectional view of a second embodiment of the present invention.

Another embodiment of the invention is shown in FIG. 5. In such an embodiment, anode 12 further includes anode layers (or layers of first electroactive electrodes), such as layers 40a through 40h. Each of the layers comprises a matrix of anode material and, in certain layers, a beneficial agent may be encapsulated within the anode matrix. It will be understood that in such an embodiment, each layer may include a different beneficial agent (or no beneficial agent at all). For example, the apparatus may include two beneficial agents (i.e. beneficial agent A and B), which alternate among the layers of the anode such that, for example, beneficial agent A is dispersed within each of anode layers 40a, 40c, 40e, 40g, and that beneficial agent B is dispersed within each of anode layers 40b, 40d, 40f, 40h. Any number of beneficial agents may be used to achieve the desired result (i.e. a different beneficial agent per layer, no beneficial agent in certain layers, alternating of two or more beneficial agents, etc.). Additionally, the anode material can vary relative to each of the anode layers, to, in turn, achieve varying rates of release of the respective beneficial agent (i.e. different anode materials that will corrode at different rates).

Figure 6:
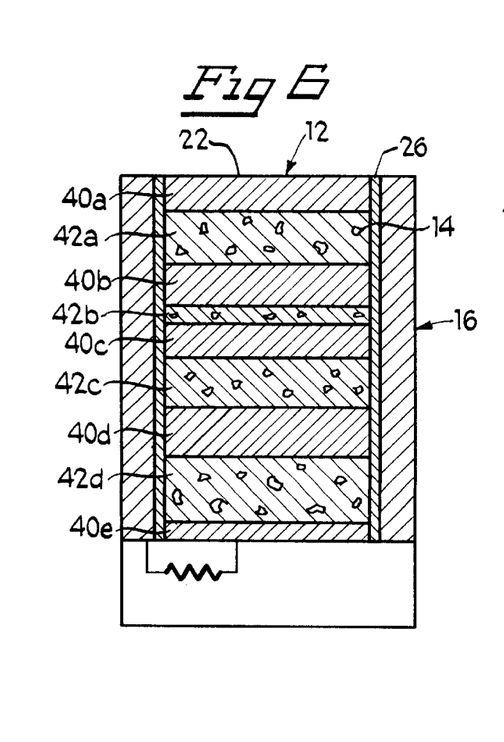
FIG. 6 of the drawings is a cross-sectional view of a third embodiment of the present invention.

Another embodiment of the invention is shown in FIG. 6. In such an embodiment, anode 12 further includes anode layers (or layers of first electroactive material) such as layers 40a through 40e. Each layer is separated a predetermined distance so as to define spaces 42a through 42d, in which, a beneficial agent is dispersed. Each of the beneficial agents placed within spaces 42a through 42d may comprise the same or different beneficial agents in varying liquid, gel or solid forms. In such an embodiment, the beneficial agent itself, or a separate connector is utilized as a means for maintaining each of the anode layers in electrical communication with the cathode. Additional beneficial agent may be encapsulated within the anode matrix for each of the anode layers (in a similar manners as with the embodiment of FIGS. 1 and 2).

In operation of the embodiment of FIG. 6, as the anode layer which includes the exposed surface corrodes, eventually, a portion of one of the openings will be exposed to ambient conditions. At such time, the beneficial agent will exit from the opening into the environment. Wherein the beneficial agent comprises a liquid, for example, as the opening becomes exposed to ambient conditions, virtually the entire contents of the beneficial agent within the opening will exit into the environment (i.e. the whole beneficial agent will be delivered relatively rapidly).

Figure 7:
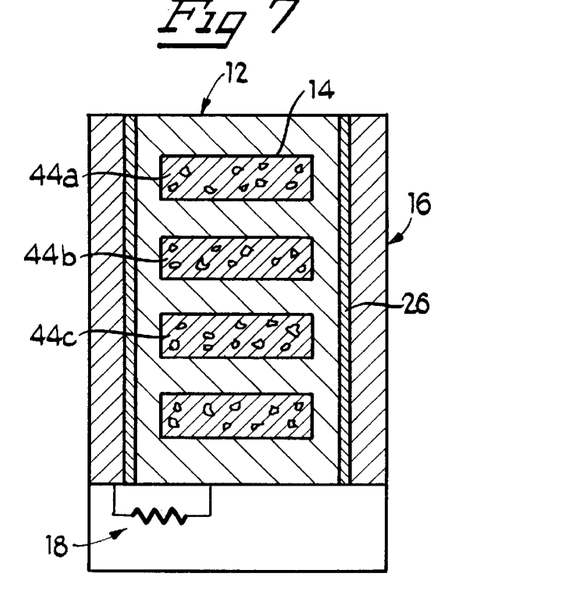
FIG. 7 of the drawings is a cross-sectional view of a fourth embodiment of the present invention.
Figure 8:
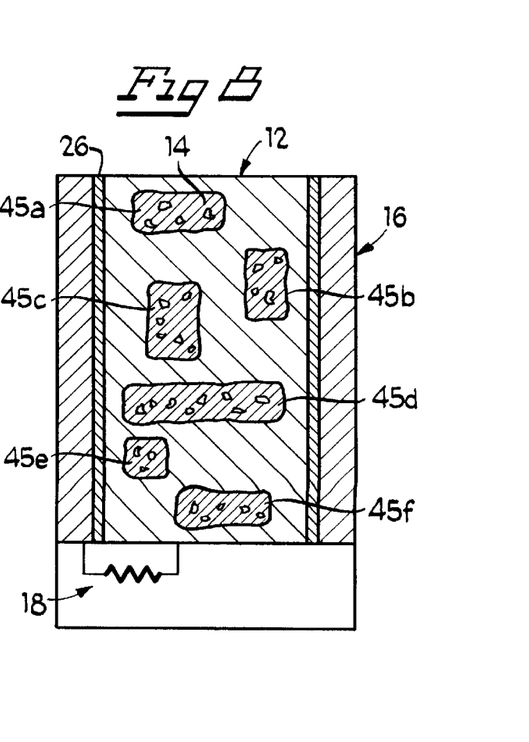
FIG. 8 of the drawings is a cross-sectional view of an alternate version of the fourth embodiment of the present invention.

Another embodiment of the invention is shown in two different versions, the first of which is shown in FIG. 7, and the second of which is shown in FIG. 8. In the version of FIG. 7, anode 12 further includes voids, such as voids 44a through 44d, whereas in the version of FIG. 8, anode 12 further includes voids 45a through 45f. As shown in FIG. 7, voids 44a–44d are substantially uniform in shape, and are uniformly spaced about the anode. A beneficial agent may be dispersed within each of voids 44a–44d. As anode 12 corrodes, sequentially each one of voids 44a–d will be placed in communication with ambient, and the beneficial agent will then exit the respective voids into the environment. It will be understood that any combination of the same or different beneficial agents may be placed within each of the voids 44a–44d.

As shown in FIG. 8, voids 45a–45f are positioned within the anode in a non-uniform manner. In such an embodiment, as the anode corrodes, a plurality of voids may be simultaneously exposed to ambient, such that multiple beneficial agents are being dispersed simultaneously. Indeed, the invention is not limited to any particular pattern, placement or orientation of the voids within the anode, and, the placement of respective voids (and placement of various different beneficial agents within the voids) can render a different operative effect. Additionally, additional beneficial agent may be encapsulated within a matrix created by the anode material itself.

Figure 9:
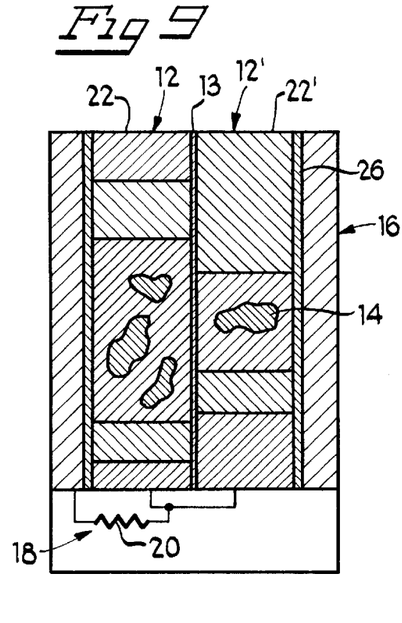
FIG. 9 of the drawings is a cross-section view of a fifth embodiment of the present invention.

Yet another embodiment of the invention is shown in FIG. 9. In such an embodiment, the anode includes two separate anode components 12, 12', separated by separator 13. As such, the separate anode components simultaneously include exposed regions 22, 22', respectively. In use, the separate anode components corrode independently of each other.

Figure 10:
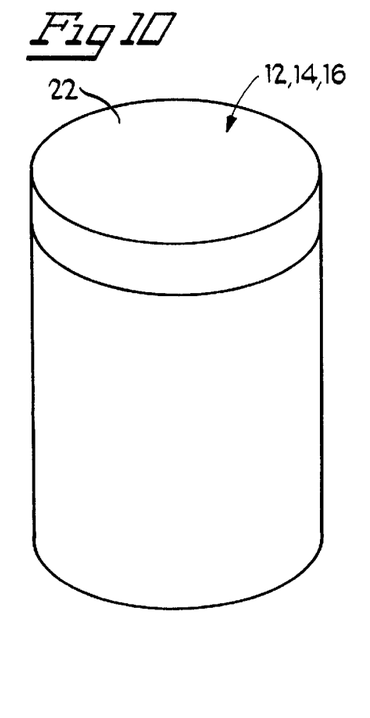
FIG. 10 of the drawings is a perspective view of a sixth embodiment of the present invention.

Another embodiment of the invention is shown in FIG. 10. In such an embodiment, the anode, cathode and beneficial agent are cast as a single material such that the beneficial agent is encapsulated by the anode and cathode matrix. Thus, the anode and cathode are in electrical communication by virtue of their physical connection. In operation, upon exposure to the environment, the anode portion of exposed region 22 begins to corrode, releasing the encapsulated beneficial agent.

Figures 11, 12, 13:
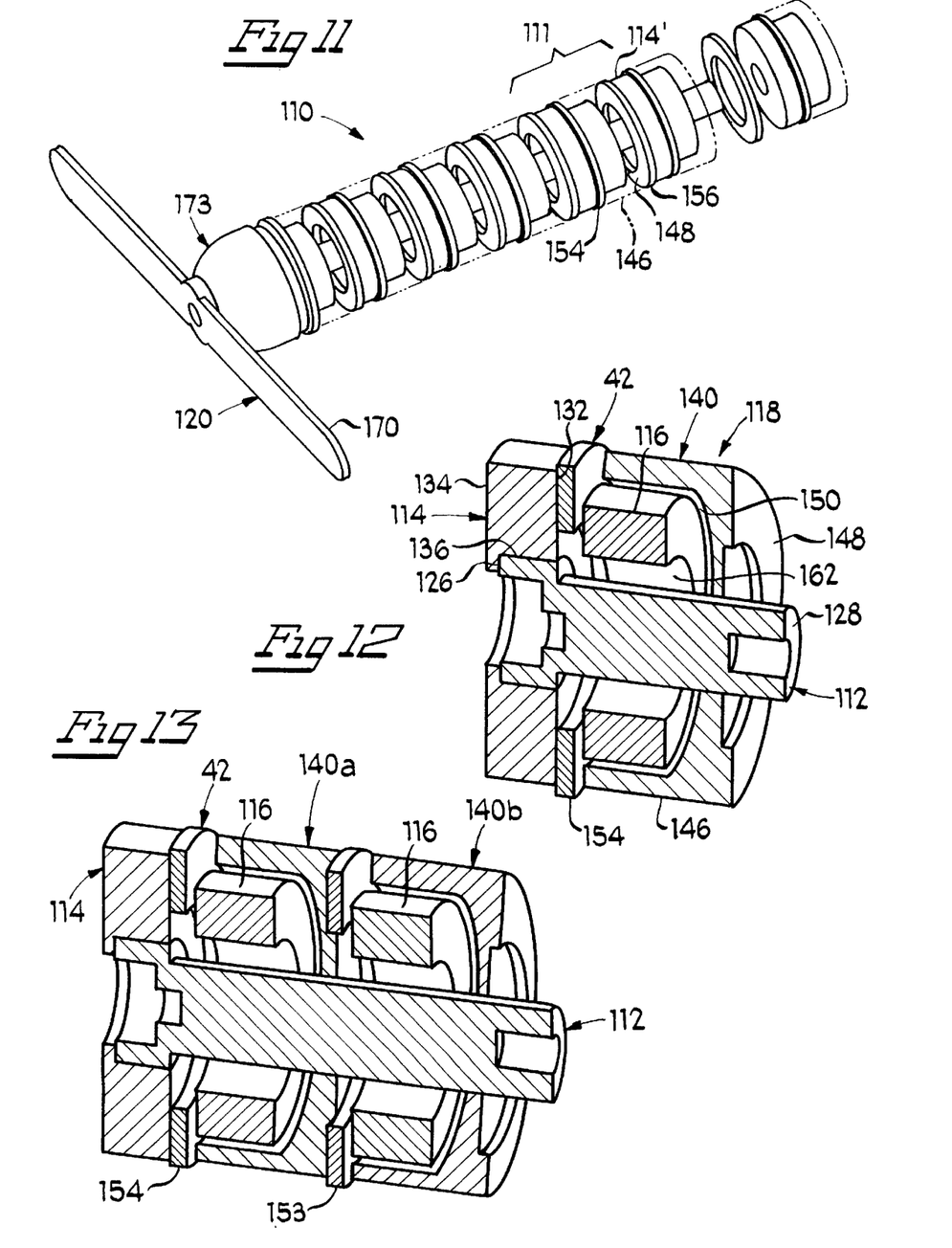
FIG. 11 of the drawings is a perspective view of a seventh embodiment of the present invention.
FIG. 12 of the drawings is a perspective view of a module of the seventh embodiment.
FIG. 13 of the drawings is a perspective view of a second embodiment of a module of the seventh embodiment.

Another embodiment of the apparatus is shown in FIG. 11 as 110. Apparatus 110 includes a plurality of delivery modules 111 and means 120 for retaining the apparatus in a desired environment. As shown in more detail in FIG. 12, each delivery module includes first electroactive electrode (anode) 112, second electroactive electrode (cathode) 114, beneficial agent 116 and means 118 for releasably retaining the beneficial agent.

Anode 112 is shown in FIG. 12 as comprising proximal end 126 and distal end 128. While anode 112 is shown in a cylindrical cross-sectional configuration, it will be understood that the anode may comprise various other uniform and non-uniform cross-sectional configurations. Cathode 114 is shown in FIG. 12 as comprising upper surface 132, lower surface 134 and attachment region 136. While cathode 114 is shown as having a circular cross-section, other cross-sections are likewise contemplated for use. Proximal end 126 of anode 112 is positioned within attachment region 136, so as to physically engage the anode and the cathode. Depending on the type of application, the cathode may comprise the materials identified above (i.e. various metals, mixtures and alloys thereof, and, conductive plastic).

As shown in FIG. 12, releasable retaining means 116 comprises reservoir 140 and means 142 for sealing the reservoir from surrounding conditions. Reservoir 140 comprises a ring-like member having outer surface 146 and top surface 148. Top surface 148 includes an opening for receipt of anode 112 therethrough. Additionally, the outer and the top surface cooperate with upper surface 132 of cathode 114 to define cavity 150.

Sealing means 142 is shown in FIG. 11 as comprising first seal member 154 and second seal member 156. First seal member 154 is positioned between upper surface 132 of cathode 114 and the lower end of outer surface 146 of reservoir 140. Second seal member 156 is positioned between top surface 148 of reservoir 140 and the lower surface of an adjoining cathode, such as cathode 114'. The sealing means, in cooperation with outer surface 146 of reservoir 140, substantially maintains cavity 150 in a fluid-tight condition.

Beneficial agent 116 is shown in FIG. 12 as comprising a tablet having opening 162. The tablet is dimensioned so that anode 112 extends through opening 162 and so that the tablet is capable of being positioned within cavity 150 of reservoir 140. In other embodiments, the beneficial agent may comprise mixtures of one or more agents a liquid, a gel, a powder, a solid or other type of material.

In one embodiment, as shown in detail in FIG. 13, a module may include two (or more) beneficial agents. In such an embodiment, each beneficial agent is retained within its own reservoir, namely, reservoirs 140a and 140b. Additionally, medial seal 153 is provided between the first and second reservoir to maintain a fluid-tight configuration for each reservoir. In other embodiments, it will be understood that additional reservoirs (in excess of two) may form each module.

Referring again to FIG. 11, releasable retaining means 120 may comprise deployable wings 170. Deployable wings 170 may be bent so as to be flush with the modules (not shown) so as to be placed within a cavity. Once placed in the cavity, the deployable wings 170 return to an extended configuration (FIG. 12) to preclude removal from within the cavity. In another embodiment, the retaining means may comprise a weighted cathode (i.e. a metal cathode, such as steel), which serves to drive and position the apparatus at the bottom of a cavity and which precludes rapid movement of the apparatus (due to the weight).

To manufacture apparatus 110, one must first assemble delivery modules 111. Referring now to FIG. 12, to assemble a delivery module, a user first attaches anode 112 to cathode 114 by inserting proximal end 126 of the anode into the attachment region 136 of cathode 114. Once attached, first seal 154 is positioned upon upper surface 132 of cathode 114. Next, the beneficial agent is placed into the desired position, by sliding the beneficial agent so that anode 112 extends through opening 162 in the beneficial agent until the beneficial agent rests upon cathode 114 and/or first seal 154. Subsequently, reservoir 140 is slid such that anode 112 extends through the opening in top surface 148, until the outside surface firmly rests upon first seal 154. In the embodiment of FIG. 13, it will be understood that after assembly of the first reservoir 140a, medial seal 153 is positioned, and the process is repeated to assemble the second reservoir 140b.

With respect to the embodiment of FIG. 11, the foregoing steps are repeated to assemble a plurality of delivery modules. Once the modules are assembled, it is necessary to attach the modules to each other. Specifically, a first module is provided. Once provided, second seal 156 is positioned upon top surface 148 of reservoir 140. Next, a second module is provided, and, distal end 128 of anode 112 is connected with the proximal end of the second module, such that the anode of the first module is firmly seated relative to at least one of the cathode and anode of the second module. Further modules can be attached in a similar manner. In such an embodiment, the first module likewise may include means 173 for covering the proximal end of the anode of the first module. The covering means precludes corrosion of the proximal end of the anode of the first module. Once all of the desired modules have been attached, releasable retention means 120 may be attached to the first module.

The operation of this embodiment will likewise be explained relative to use in the gastro-intestinal system of an animal with the understanding that use of such an apparatus is not limited thereto. Specifically, to prepare the apparatus for use, the user collapses releasable retaining means 120 so that deployable wings 170 are folded against the modules. The deployable wings may be retained in position by, for example, biodegradable tape or string (not shown). Of course, certain embodiments may require different releasable retaining means or may omit this element altogether.

Once the retaining means have been positioned in the non-deployed position, the apparatus is ready for insertion into the stomach. As such, the user can have the animal swallow the apparatus or the user can surgically implant the apparatus. As the device enters the stomach of the animal, the biodegradable tape or string degrades and the deployable wings deploy so as to preclude the passing of the apparatus from the stomach to the intestines.

Once the stomach cavity, in the presence of fluid within the stomach (electrolyte), the anode and cathode react so as to corrode the exposed anode (which comprises only the distal end of the anode of the outermost module). As the anode of the last module corrodes beyond the top surface of reservoir 140, the reservoir detaches from the anode exposing the beneficial agent. The reservoir is passed through the intestines and the beneficial agent is dispersed within the cavity (and eventually absorbed, for example). As the corrosion of the anode continues, eventually, the anode corrodes beyond the cathode and the cathode detaches from the apparatus. The cathode (along with the respective seals) likewise pass through the intestines. At such time, the distal end of the subsequent module becomes exposed and the cycle repeats with the subsequent module. This process continues until the last anode corrodes.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. An apparatus for delivering a beneficial agent to a surrounding area comprising:
   a first electroactive electrode having an outer surface, a portion of the outer surface being exposable to the surrounding area;
   a beneficial agent dispersed within the first electroactive electrode;
   a second electroactive electrode associated with the first electroactive electrode; and
   means for electrically associating the first electroactive electrode and the second electroactive electrode, to, facilitate at least one of corrosion and mass transfer of the exposable surface of the first electroactive electrode, upon exposure of same to the surrounding area(electrolyte), and, in turn the release of the beneficial agent.

2. The apparatus of claim 1 wherein the first electroactive electrode and the beneficial agent are formed into a composite wherein the beneficial agent is encapsulated within a first electroactive electrode matrix.

3. The apparatus of claim 1 wherein the first electroactive electrode, the second electroactive electrode and the beneficial agent are formed into a composite wherein the beneficial agent is encapsulated within a first electroactive electrode and second electroactive electrode matrix.

4. The apparatus of claim 1 wherein the first electroactive electrode comprises at least two first electroactive electrode layers, at least one of the first electroactive electrode layers combined with the beneficial agent to form a matrix wherein the beneficial agent is encapsulated within a first electroactive electrode matrix.

5. The apparatus of claim 4 wherein the beneficial agent comprises at least two beneficial agents, at least one of the at least two layers having one of the at least two beneficial agents forming a matrix therewith, and at least one of the other of the at least two layers having another of the at least two beneficial agents forming a matrix therewith.

6. The apparatus of claim 1 wherein:
   the first electroactive electrode comprises at least two spaced apart first electroactive electrode layers defining a space therebetween;
   the beneficial agent positioned within at least one space between two of the at least two spaced apart first electroactive electrode layers; and
   the electrical associating means capable of associating each first electroactive electrode layer with at least one of at least one other first electroactive electrode and the second electroactive electrode.

7. The apparatus of claim 6 wherein the first electroactive electrode includes a plurality of layers defining at least two spaces.

8. The apparatus of claim 7 wherein the beneficial agent comprises at least two different beneficial agents, at least one of the at least two spaces having one of the at least two different beneficial agents positioned therein, and at least one of the at least two spaces having another one of the at least two different beneficial agents positioned therein.

9. The apparatus of claim 8 wherein the beneficial agent comprises two beneficial agents, the two beneficial agents positioned in alternating spaces within the first electroactive electrode.

10. The apparatus of claim 6 wherein at least one of the at least two first electroactive electrode layers is combined with the beneficial agent to form a matrix wherein the beneficial agent is encapsulated within a first electroactive electrode matrix.

11. The apparatus of claim 6 wherein each first electroactive electrode layer is substantially similar thickness.

12. The apparatus of claim 6 wherein at least two of the at least two first electroactive electrode layers comprise a different thicknesses.

13. The apparatus of claim 1 wherein the first electroactive electrode includes at least one void therein, the beneficial agent disbursed within the at least one void.

14. The apparatus of claim 1 wherein the first electroactive electrode includes a plurality of disconnected voids therein, the beneficial agent being positioned within at least one of the plurality of disconnected voids therein.

15. The apparatus of claim 14 wherein the voids are substantially identical in at least one of shape and volume.

16. The apparatus of claim 14 wherein the beneficial agent comprises at least two different beneficial agents, at least one of the plurality of disconnected voids having one of the at least two different beneficial agents positioned therein, and at least one of the plurality of disconnected voids having another one of the at least two different beneficial agents positioned therein.

17. The apparatus of claim 16 wherein the beneficial agent comprises two beneficial agents, the two beneficial agents positioned in alternating voids within the first electroactive electrode.

18. The apparatus of claim 1 further including means for controlling the rate of corrosion of the exposed surface of the first electroactive electrode.

19. The apparatus of claim 18 wherein the corrosion rate controlling means comprises one of the group consisting of: a power source, a power cell, a battery, current limiting devices, electronic circuitry, diodes, capacitors, resistors, IC's, and transistors.

20. The apparatus of claim 18 wherein the corrosion rate controlling means comprises a resistor.

21. The apparatus of claim 1 wherein the first electroactive electrode comprises a top surface, a bottom surface and a cylindrical surface, a portion of the top surface comprises the exposed area.

22. The apparatus of claim 1 wherein the beneficial agent comprises any one or more of pain medications, anti-parasitic drugs, growth hormones, diabetic agents, anesthetic agents, anti-bloating agents.

23. The apparatus of claim 1 wherein one of the first electroactive electrode and second electroactive electrode comprises one of the group consisting of Al, Cu, Mg, Fe, Zn, Ag, Ca as well as mixtures and alloys thereof.

24. The apparatus of claim 1 wherein the exposable portion of the first electroactive electrode comprises at least two different first electroactive electrode materials.

25. A method for delivering a beneficial agent to a surrounding area comprising the steps of:

providing a beneficial agent;

dispersing the beneficial agent within a first electroactive electrode;

exposing a portion of an outer surface of the first electroactive electrode;

electrically associating the first electroactive electrode with a second electroactive electrode;

corroding at least a portion of the exposed portion of the first electroactive electrode; and releasing the beneficial agent disbursed within the first electroactive electrode upon corrosion thereof.

26. The method of claim 25 wherein:

the step of providing a beneficial agent comprises the step of providing at least two beneficial agents;

the step of dispersing the beneficial agent comprises the step of dispersing at least two beneficial agents; and the step of releasing the beneficial agent comprises the step of sequentially releasing one of the at least two beneficial agents and then the other of the at least two beneficial agents.

27. The method of claim 25 wherein:

the step of providing a beneficial agent comprises the step of providing at least two beneficial agents;

the step of dispersing the beneficial agent comprises the step of dispersing at least two beneficial agents; and the step of dispersing the beneficial agent comprises the step of alternatively releasing one of the at least two beneficial agents and the other of the at least two beneficial agents.

28. The method of claim 25 further comprising the step of controlling the rate at which the first electroactive electrode corrodes.

29. The method of claim 25 wherein the step of dispersing the beneficial agent comprises the step of molding a first electroactive electrode material with a beneficial agent to form a composite.

30. The method of claim 25 wherein the step of dispersing the beneficial agent comprises the steps of:

providing at least two spaced apart first electroactive electrode layers; and placing the beneficial agent between the at least two spaced apart first electroactive electrode layers.

31. The method of claim 25 wherein the step of dispersing beneficial agent comprises the steps of:

providing a first electroactive electrode having at least one void therein; and placing the beneficial agent within the void of the first electroactive electrode.

32. The method of claim 25 wherein the first electroactive electrode comprises at least two different materials, the step of exposing comprising the step of exposing each of the at least two different materials.

33. An apparatus for delivering a beneficial agent to a surrounding area comprising:

at least two modules, each module including, a first electroactive electrode having an outer surface, a portion of the outer surface being exposable to the surrounding area;

a second electroactive electrode in electrical communication with the first electroactive electrode; and means for releasably retaining at least one beneficial agent upon corrosion or mass transfer of the exposable surface of the first electroactive electrode, wherein the at least two modules are positioned in series so as to place the first electroactive electrodes in electrical communication with each other.

34. The apparatus of claim 33 wherein the releasable retaining member of at least one of the at least two modules further comprises:

a reservoir releasably associated with the anode, the reservoir defining a cavity for retaining a beneficial agent.

35. The apparatus of claim 34 wherein the releasable retaining means further includes means for sealing the cavity, to, in turn, render the cavity substantially fluid-tight.

36. The apparatus of claim 33 wherein the releasable retaining member of at least one of the at least two modules further comprises:

at least two reservoirs, each of the at least two reservoirs releasably associated with the anode, the reservoirs including a cavity for retaining a beneficial agent.

* * * * *